(12) United States Patent
Howard et al.

(10) Patent No.: US 12,113,250 B2
(45) Date of Patent: Oct. 8, 2024

(54) ENERGY STORAGE DEVICE

(71) Applicant: Dyson Technology Limited, Wiltshire (GB)

(72) Inventors: Joseph Daniel Howard, Swindon (GB); Michael Edward Rendall, Newbury (GB)

(73) Assignee: Dyson Technology Limited, Malmesbury (GB)

( * ) Notice: Subject to any disclaimer, the term of this patent is extended or adjusted under 35 U.S.C. 154(b) by 823 days.

(21) Appl. No.: 17/261,525

(22) PCT Filed: Jul. 19, 2019

(86) PCT No.: PCT/GB2019/052030
§ 371 (c)(1),
(2) Date: Jan. 19, 2021

(87) PCT Pub. No.: WO2020/016600
PCT Pub. Date: Jan. 23, 2020

(65) Prior Publication Data
US 2021/0265640 A1    Aug. 26, 2021

(30) Foreign Application Priority Data
Jul. 20, 2018  (GB) ..................... 1811886

(51) Int. Cl.
*H01M 6/40*    (2006.01)
*H01M 6/18*    (2006.01)
(Continued)

(52) U.S. Cl.
CPC .............. *H01M 6/40* (2013.01); *H01M 6/18* (2013.01); *H01M 10/0436* (2013.01); *H01M 10/0585* (2013.01); *H01M 50/586* (2021.01)

(58) Field of Classification Search
CPC ........ H01M 6/40; H01M 50/586; H01M 6/18; H01M 10/0436; H01M 10/0585
See application file for complete search history.

(56) References Cited

U.S. PATENT DOCUMENTS 4,758,526 A   7/1988  Thalheimer
6,323,056 B1  11/2001 Miyoshi
(Continued)

FOREIGN PATENT DOCUMENTS

EP   2491601 B1   11/2016
GB   2548361 A    9/2017
(Continued)

OTHER PUBLICATIONS

International Search Report and Written Opinion mailed Sep. 30, 2019, directed to International Application No. PCT/GB2019/052030; 11 pages.

(Continued)

*Primary Examiner* — Milton I Cano
*Assistant Examiner* — Albert Michael Hilton
(74) *Attorney, Agent, or Firm* — Tucker Ellis LLP

(57) ABSTRACT

A method comprising providing, on a substrate, a stack for an energy storage device, the stack comprising a first electrode layer, a second electrode layer, and an electrolyte layer between the first electrode layer and the second electrode layer. A groove is formed at least through the second electrode layer and the electrolyte layer such that the groove is wider in the second electrode layer than in the electrolyte layer. An electrically insulating material is provided in the groove. An electrically conductive material is provided in the groove, on the electrically insulating material.

4 Claims, 5 Drawing Sheets

(51) Int. Cl.
    *H01M 10/04*     (2006.01)
    *H01M 10/0585*     (2010.01)
    *H01M 50/586*     (2021.01)

(56) References Cited

U.S. PATENT DOCUMENTS

| | | |
|---|---|---|
| 2007/0079866 A1 | 4/2007 | Borden et al. |
| 2008/0032236 A1 | 2/2008 | Wallace et al. |
| 2009/0148764 A1 | 6/2009 | Kwak et al. |
| 2011/0139216 A1 | 6/2011 | Lee et al. |
| 2015/0102530 A1* | 4/2015 | Wallace ............ H01M 10/0436 355/77 |

FOREIGN PATENT DOCUMENTS

| | | |
|---|---|---|
| JP | H4-116986 A | 4/1992 |
| KR | 10-1039149 B1 | 6/2011 |
| KR | 10-1379243 B1 | 3/2014 |
| WO | 2008/011061 A1 | 1/2008 |

OTHER PUBLICATIONS

Search Report dated Sep. 26, 2018, directed to GB Application No. 1811886.9; 1 page.

Office Action received for Korean Patent Application No. 10-2021-7004581, mailed on Nov. 8, 2022, 8 pages (4 pages of English Translation and 4 pages of Original Document).

* cited by examiner

ENERGY STORAGE DEVICE

REFERENCE TO RELATED APPLICATIONS

This application is a national stage application under 35 U.S.C. 371 of International Application No. PCT/GB2019/052030, filed Jul. 19, 2019, which claims the priority of United Kingdom Application No. 1811886.9, filed Jul. 20, 2018, the entire contents of each of which are incorporated herein by reference.

FIELD OF THE DISCLOSURE

The present disclosure relates to methods of manufacturing an energy storage device, an energy storage device and an intermediate structure for manufacture of an energy storage device.

BACKGROUND OF THE DISCLOSURE

Energy storage devices such as solid-state thin film cells may be produced by forming a stack of layers on a substrate. The stack of layers typically includes a first electrode layer, a second electrode layer, and an electrolyte layer between the first electrode layer and the second electrode layer. A combination of the stack and the substrate may then be cut into separate sections to form individual cells.

To avoid short circuits, an electrically insulating material may be provided to insulate the first electrode layer from the second electrode layer. The first electrode layer and the second electrode layer may each be connected to an external circuit via an electrically conductive material.

It is desirable to provide a method of manufacturing an energy storage device that is simpler or more efficient than known manufacturing methods.

SUMMARY OF THE DISCLOSURE

According to some embodiments of the present disclosure, there is provided a method comprising:
  providing, on a substrate, a stack for an energy storage device, the stack comprising a first electrode layer, a second electrode layer, and an electrolyte layer between the first electrode layer and the second electrode layer;
  forming a groove at least through the second electrode layer and the electrolyte layer such that the groove is wider in the second electrode layer than in the electrolyte layer;
  providing an electrically insulating material in the groove; and
  providing an electrically conductive material in the groove, on the electrically insulating material.

By forming a groove that is wider in the second electrode layer than in the electrolyte layer, the electrically insulating material may be more effectively contained within the groove. The containment of the electrically conductive material within the groove may also be improved. For example, the electrically conductive material may be located mainly or entirely within the wider part of the groove, which may provide a larger containment region for the electrically conductive material than otherwise. This may therefore reduce contact between the electrically conductive material and portions of the stack outside the groove, which may otherwise occur if the electrically conductive material is not adequately contained within the groove. A smaller quantity of the electrically conductive material may therefore be used to provide a sufficient electrical connection between one of the first or second electrode layers and an electrical connector (for example for connection to an external circuit). The method may therefore allow an energy storage device to be manufactured more efficiently.

In some embodiments, forming the groove at least through the second electrode layer and the electrolyte layer forms an exposed surface of the electrolyte layer which is more wettable for the electrically conductive material than an exposed surface of the second electrode layer. In these embodiments, the electrically conductive material prefers to wet the exposed surface of the electrolyte layer rather than the exposed surface of the second electrode layer. This may further improve the containment of the electrically conductive material within the groove, for example in cases in which the exposed surface of the electrolyte is within the groove.

In some embodiments in which the second electrode layer is further from the substrate than the first electrode layer, a first portion of the exposed surface of the second electrode layer may be outside the groove. The first portion of the exposed surface of the second electrode layer may for example be an exposed surface of the stack, which is opposite to an unexposed surface of the stack, which is in contact with the substrate. The exposed surface of the stack may therefore be an upper surface of the stack. In some embodiments such as this, the electrically conductive material may prefer to wet the exposed surface of the electrolyte layer, within the groove, rather than the first portion of the exposed surface of the second electrode layer, which is outside the groove. The electrically conductive material may therefore preferentially remain within the groove, rather than contacting the first portion of the exposed surface of the second electrode layer, outside the groove. This may further improve confinement of the electrically conductive material within the groove.

In some embodiments such as this, providing the electrically conductive material in the groove may include depositing the electrically conductive material on the first portion of the exposed surface of the second electrode layer, whereby the electrically conductive material flows into the groove. The electrically conductive material in such cases may therefore move into the groove spontaneously, without being subjected to an external stimulus. For example, the difference in wettabilities between the exposed surfaces of the second electrode layer and the electrolyte layer may be sufficient to cause the electrically conductive material to travel from contacting the first portion of the exposed surface of the second electrode layer to contacting the electrolyte layer. This may reduce manufacturing constraints on a location of deposition of the electrically conductive material. For example, rather than depositing the electrically conductive material precisely within the groove, the electrically conductive material may instead be deposited over a larger deposition area (such as on the first portion of the exposed surface of the second electrode layer). The electrically conductive material may nevertheless flow into the groove. In this way, the electrically conductive material may be provided in the groove in a more straightforward manner.

In some embodiments, the exposed surface of the electrolyte layer is more hydrophilic than the first portion of the exposed surface of the second electrode layer. This may be the case where the electrically conductive material prefers to wet surfaces with a higher hydrophilicity (i.e. with a lower hydrophobicity). In such cases, the electrically conductive material may dewet the first portion of the exposed surface of the second electrode layer and move to contact the exposed surface of the electrolyte layer, within the groove.

In some embodiments, the groove is formed through the second electrode layer, the electrolyte layer and the first electrode layer to form an exposed surface of the substrate. In these examples, the electrically insulating material may contact exposed surfaces of the electrolyte layer and the first electrode layer within the groove, improving the insulation of the first electrode layer from the second electrode layer. In such examples, the exposed surface of the substrate may be more wettable to the electrically insulating material than the exposed surface of the electrolyte layer. This may further aid movement of the electrically insulating material into the groove. For example, the electrically insulating material may move towards the exposed surface of the substrate, further into the groove, due to its preference to wet the exposed surface of the substrate. The electrically insulating material may then remain in contact with the exposed surface of the substrate, rather than contacting the exposed surface of the electrolyte layer which is less wettable to the electrically insulating material. In this way, the electrically insulating material may be effectively, and straightforwardly, confined within the groove.

In some embodiments, providing the electrically insulating material in the groove includes depositing the electrically insulating material on the exposed surface of the electrolyte, whereby the electrically insulating material flows into contact with the exposed surface of the substrate. In these examples, the electrically insulating material may move into the groove spontaneously. As explained similarly with reference to deposition of the electrically conductive material, this may allow the electrically insulating material to be deposited over a larger deposition area, simplifying manufacture of the energy storage device.

In some embodiments, the exposed surface of the electrolyte layer is more hydrophilic than the exposed surface of the substrate. This may be the case where the electrically insulating material has a greater affinity for surfaces with a lower hydrophilicity (i.e. with a higher hydrophobicity). In such cases, the electrically insulating material may dewet the exposed surface of the electrolyte layer and move to contact the exposed surface of the substrate, within the groove.

In some embodiments, the exposed surface of the electrolyte layer is more wettable for the electrically conductive material than the electrically insulating material. Hence, due to the greater affinity of the electrically conductive material for the exposed surface of the electrolyte layer, the electrically conductive material may dewet the electrically insulating material. This may encourage the electrically conductive material to move away from the electrically insulating material, and into contact with a second portion of the second electrode layer, which is within the groove. This may improve an electrical connection between the electrically conductive material and the second electrode layer. Dewetting of the electrically insulating material in this way may occur spontaneously, without external stimuli, simplifying the creation of an electrical contact between the electrically conductive material and the second electrode layer.

In some embodiments, the exposed surface of the electrolyte layer is more hydrophilic than the electrically insulating material. This may be the case where the electrically conductive material prefers to wet surfaces with a higher hydrophilicity (i.e. with a lower hydrophobicity). This may cause the electrically conductive material to dewet the electrically insulating material and move into contact with the second electrode layer.

In some embodiments, after providing the electrically conductive material in the groove, the electrically conductive material is substantially absent from the exposed surface of the second electrode layer. In these embodiments, the electrically conductive material may therefore be contained within the groove, without overflowing to contact other surfaces of the stack, such as the exposed surface of the second electrode layer. This may allow a smaller quantity of the electrically conductive material to be used in the manufacture of the energy storage device. The energy storage device may therefore be manufactured more efficiently.

In some embodiments, the electrically conductive material is provided in the groove such that the electrically conductive material is in contact with the exposed surface of the electrolyte layer and a surface of the electrically insulating material. The electrically conductive material may therefore be supported by or otherwise touching both the exposed surface of the electrolyte layer and the surface of the electrically insulating material. In these cases, the electrically conductive material may extend towards an exposed surface of a cell for an energy storage device after the stack has been separated into multiple cells. For example, a side of the electrically conductive material may lie flush with a side of the cell. This may allow the cell to be connected with other cells or with other circuitry (such as an external circuit) more straightforwardly than if the electrically conductive material is recessed or further away from the exposed surface of the cell.

In some embodiments, the exposed surface of the electrolyte layer has a width of greater than or equal to approximately 5 micrometres in a direction perpendicular to a surface of the substrate. With this width, the exposed surface of the electrolyte layer may be sufficiently wide to contain a relatively large proportion of the electrically conductive material within the groove. As explained herein, this may therefore allow the energy storage device to be manufactured more efficiently.

In some embodiments, the electrically conductive material is provided in the groove such that the electrically conductive material is in contact with a second portion of the exposed surface of the second electrode layer which is within the groove. Contact between the electrically conductive material and the second portion of the exposed surface of the second electrode layer may therefore provide an electrical connection between the electrically conductive material and the second electrode layer. This allows the second electrode layer to be connected to other components (such as other cells of a multi-cell energy storage device, or an external circuit), via the electrically conductive material. Such an electrical connection may extend in a direction perpendicular to the width of the exposed surface of the electrolyte layer, in a plane parallel to the exposed surface of the electrolyte layer. This may reduce the risk of fusing occurring, where the electrically conductive material meets the second electrode layer, during use of the energy storage device. For example, fusing may be less likely to occur than in cases in which the electrically conductive material meets the second electrode layer intermittently or with a relatively small contact area.

In some embodiments, the second portion of the exposed surface of the second electrode layer is more wettable for the electrically conductive material than the electrically insulating material. The electrically conductive material may therefore prefer to wet the second portion of the exposed surface of the second electrode layer rather than the electrically insulating material. Hence, the electrically conductive material may dewet the electrically insulating material and move towards the second portion of the exposed surface of the second electrode layer and into contact with the second electrode layer. This allows an electrical connection between the second electrode layer and the electrically conductive material to be formed spontaneously, without an external stimulus. This may simplify the formation of such an electrical connection.

In some embodiments, the electrically insulating material in the groove has a curved surface. The curved surface of the electrically insulating material may be used to further constrain the position of the electrically conductive material on the electrically insulating material. For example, if the electrically insulating material has a convex surface, the electrically conductive material may dewet the electrically insulating material to a greater extent than if the electrically insulating material has other surface shapes. This may improve the containment of the electrically conductive material on the second portion of the exposed surface of the second electrode layer and improve the electrical connection between the electrically conductive material and the second electrode layer. Conversely, if the electrically insulating material has a concave surface, an exposed surface of the electrically conductive material may have a larger surface area than otherwise. This larger surface area may therefore provide a larger available area for electrical connections between the electrically conductive material and other electrical components. This may simplify the connection of the electrically conductive material to these other electrical components. Furthermore, the cell may be used more flexibly, as it may be connected to a greater range of different electrical components than other cells with a smaller available area for electrical connections.

In some embodiments, the groove has a substantially T-shaped cross-section. This for example provides a suitable shape of the groove for containing both the electrically insulating material and the electrically conductive material. Such a shape may be manufactured straightforwardly, for example using laser ablation, as described herein.

In some embodiments, at least one of the electrically insulating material is provided as a first liquid or the electrically conductive material is provided as a second liquid. This allows one or both of the electrically insulating material and the electrically conductive material to be provided simply, for example using ink jet printing. Furthermore, liquids tend to flow without external influences, to conform to a shape of a container (such as the groove described herein). Hence, depositing either or both of the electrically insulating material and the electrically conductive material as liquids allows either of these materials to flow into a desired position in a simple manner. The flow of these materials may be controlled straightforwardly, for example by controlling a wettability of surfaces these materials are intended to contact.

In accordance with some embodiments of the present disclosure, there is provided an energy storage device comprising:
    a substrate;
    a stack on the substrate, the stack comprising:
        a first electrode;
        a second electrode; and
        an electrolyte between the first electrode and the second electrode, the first electrode closer than the second electrode to the substrate, the electrolyte comprising a first portion overlapped by the second electrode and a second portion not overlapped by the second electrode;
    an electrically insulating material in contact with the first electrode and the electrolyte; and
    an electrically conductive material in contact with the second portion of the electrolyte and the second electrode.

With the electrolyte having the first portion overlapped by the second electrode and the second portion not overlapped by the second electrode, the second electrode may have a smaller width than the electrolyte. Such a width may be taken in a plane parallel to a plane of the substrate, for example. This may therefore provide the electrolyte with an exposed surface, which is for example a surface of the second portion of the electrolyte, which is not overlapped by the second electrode. The second portion of the electrolyte for example provides a contact area (which may be a ledge or shelf for example) for supporting the electrically conductive material. The electrically conductive material may be supported, and confined on the second portion of the electrolyte, in contact with the second electrode. The second electrode may be connected to other electrical components (such as other cells or an external circuit) via the electrically conductive material. Hence, such an energy storage device may be connected to other electrical components straightforwardly. Moreover, such an energy storage device may be manufactured in a simple or efficient manner, such as the methods described with reference to some embodiments of the present disclosure.

In some embodiments, a width of a surface of the second portion of the electrolyte, in a plane parallel to a plane of a surface of the substrate, is greater than or equal to approximately 5 micrometres. As explained with reference to some embodiments of the present disclosure, with this width, the surface of the second portion of the electrolyte may efficiently support or otherwise contain a large proportion of the electrically conductive material. This allows the energy storage device to be manufactured more efficiently. Furthermore, an electrical connection between the electrically conductive material and the second electrode may be improved, and be less susceptible to fusing.

In some embodiments, the electrically insulating material is substantially absent from contact with the second electrode. This may therefore provide for a larger contact area between the electrically conductive material and the second electrode than otherwise, which may improve electrical contact between the electrically conductive material and the second electrode.

In accordance with some embodiments of the present disclosure, there is provided a method comprising:
    providing, on a substrate, a stack for an energy storage device, the stack comprising a first electrode layer, a second electrode layer, and an electrolyte layer between the first electrode layer and the second electrode layer, the stack comprising a groove at least through the second electrode layer and the electrolyte layer, wherein the groove is wider in the second electrode layer than in the electrolyte layer such that the electrolyte layer comprises a first portion overlapped by the second electrode layer and a second portion not overlapped by the second electrode layer; and
    depositing an electrically insulating material on an exposed surface of the second portion of the electrolyte layer, whereby the electrically insulating material flows into the groove to contact an exposed surface within the groove which is more wettable to the electrically insulating material than the exposed surface of the second portion of the electrolyte layer.

Similarly to some embodiments of the present disclosure, examples in accordance with some embodiments of the present disclosure improve containment of the electrically insulating material within the groove. The electrically insulating material may move into the groove spontaneously, for example. This may reduce manufacturing constraints on deposition of the electrically insulating material and simplify provision of the electrically insulating material in the groove. Furthermore, the electrically insulating material may be provided more efficiently than in other methods in which the electrically insulating material is less effectively confined within the groove.

In some embodiments, the groove extends to an exposed surface of the substrate and the exposed surface within the groove comprises the exposed surface of the substrate. This may further encourage the electrically insulating material to flow into the groove, and remain within the groove, as the exposed surface of the substrate may correspond with a deepest surface within the groove. A deepest surface is for example a surface within the groove which is furthest from an entrance to the groove.

In some embodiments, the exposed surface of the second portion of the electrolyte layer is substantially parallel to a surface of the substrate. In this way, the energy storage device may be manufactured straightforwardly. For example, a series of layers may be deposited sequentially, to provide the stack on the substrate. The groove may be formed through the series of layers and, subsequently, the electrically insulating material may be provided.

In accordance with some embodiments of the present disclosure, there is provided an intermediate structure for an energy storage device, the intermediate structure comprising: a substrate;
  a stack on the substrate, the stack comprising:
  a first electrode layer;
    a second electrode layer; and
    an electrolyte layer between the first electrode layer and the second electrode layer,
    the stack comprising a groove at least through the second electrode layer and the electrolyte layer, wherein the groove is wider in the second electrode layer than in the electrolyte layer such that the electrolyte layer comprises a first portion overlapped by the second electrode layer and a second portion not overlapped by the second electrode layer; and
  an electrically insulating material in contact with an exposed surface within the groove which is more wettable to the electrically insulating material than an exposed surface of the second portion of the electrolyte layer.

With such an intermediate structure, the electrically insulating material may be more effectively confined within the groove. This for example simplifies deposition of the electrically insulating material and may improve the efficiency of manufacturing of an energy storage device using the intermediate structure.

Further features will become apparent from the following description, given by way of example only, which is made with reference to the accompanying drawings.

DETAILED DESCRIPTION OF THE DISCLOSURE

Details of methods, structures and devices according to examples/embodiments will become apparent from the following description, with reference to the Figures. In this description, for the purpose of explanation, numerous specific details of certain examples/embodiments are set forth. Reference in the specification to "an example," "an embodiment," or similar language means that a particular feature, structure, or characteristic described in connection with the example is included in at least that one example, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
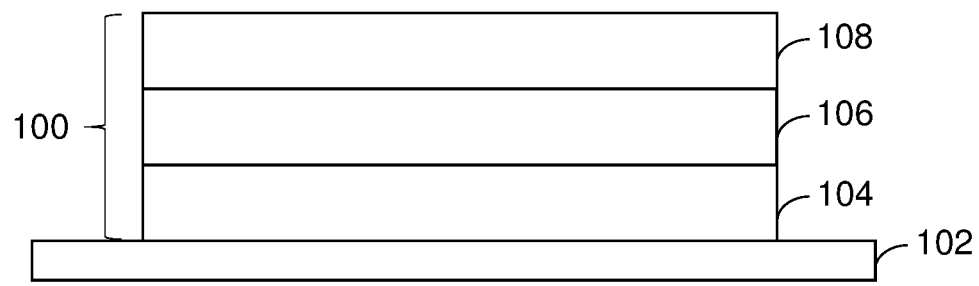
FIG. 1 is a schematic diagram that shows a stack for an energy storage device according to some embodiments.

FIG. 1 shows a stack 100 of layers for an energy storage device. The stack 100 of FIG. 1 may be used as part of a thin-film energy storage device having a solid electrolyte, for example.

The stack 100 is on a substrate 102 in FIG. 1. The substrate 102 is for example glass or polymer and may be rigid or flexible. The substrate 102 is typically planar, although it need not be in all cases. Although the stack 100 is shown as directly contacting the substrate 102 in FIG. 1, there may be one or more further layers between the stack 100 and the substrate 102 in other examples. Hence, unless otherwise indicated, reference herein to an element being "on" another element is to be understood as including direct or indirect contact. In other words, an element on another element may be either touching the other element, or not in contact with the other element but, instead, generally supported by an intervening element (or elements) but nevertheless located above, or overlapping, the other element.

The stack 100 of FIG. 1 includes a first electrode layer 104, an electrolyte layer 106 and a second electrode layer 108. In the example of FIG. 1, the second electrode layer 108 is further from the substrate 102 than the first electrode layer 104, and the electrolyte layer 106 is between the first electrode layer 104 and the second electrode layer 108.

The first electrode layer 104 may act as a positive current collector layer. In such embodiments, the first electrode layer 104 may form a positive electrode layer (which may correspond with a cathode during discharge of a cell of the energy storage device including the stack 100). The first electrode layer 104 may include a material which is suitable for storing lithium ions by virtue of stable chemical reactions, such as lithium cobalt oxide, lithium iron phosphate or alkali metal polysulphide salts.

In alternative embodiments, there may be a separate positive current collector layer, which may be located between the first electrode layer 104 and the substrate 102. In these embodiments, the separate positive current collector layer may include nickel foil, but it is to be appreciated that any suitable metal could be used, such as aluminium, copper or steel, or a metalised material including metalised plastics such as aluminium on polyethylene terephthalate (PET).

The second electrode layer 108 may act as a negative current collector layer. The second electrode layer 108 in such cases may form a negative electrode layer (which may correspond with an anode during discharge of a cell of an energy storage device including the stack 100).

The second electrode layer 108 may include a lithium metal, graphite, silicon or indium tin oxide (ITO). As for the first electrode layer 104, in other embodiments, the stack 100 may include a separate negative current collector layer, which may be on the second electrode layer 108, with the second electrode layer 108 between the negative current collector layer and the substrate 102.

In some embodiments in which the negative current collector layer is a separate layer, the negative current collector layer may include nickel foil. It is to be appreciated, though, that any suitable metal could be used for the negative current collector layer, such as aluminium, copper or steel, or a metalised material including metalised plastics such as aluminium on polyethylene terephthalate (PET).

The first and second electrode layers 104, 108 are typically electrically conductive. Electrical current may therefore flow through the first and second electrode layers 104, 108 due to the flow of ions or electrons through the first and second electrode layers 104, 108.

The electrolyte layer 106 may include any suitable material which is ionically conductive, but which is also an electrical insulator, such as lithium phosphorous oxynitride (LiPON). As explained above, the electrolyte layer 106 is for example a solid layer, and may be referred to as a fast ion conductor. A solid electrolyte layer may have a structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two dimensional or three dimensional lattice. Ions of a crystalline material are typically immobile and may therefore be unable to move freely throughout the material.

The stack 100 may for example be manufactured by depositing the first electrode layer 104 on the substrate 102. The electrolyte layer 106 is subsequently deposited on the first electrode layer 104, and the second electrode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo further processing to manufacture an energy storage device. An example of processing that may be applied to the stack 100 of FIG. 1 is illustrated schematically in FIG. 2.

Figure 2:
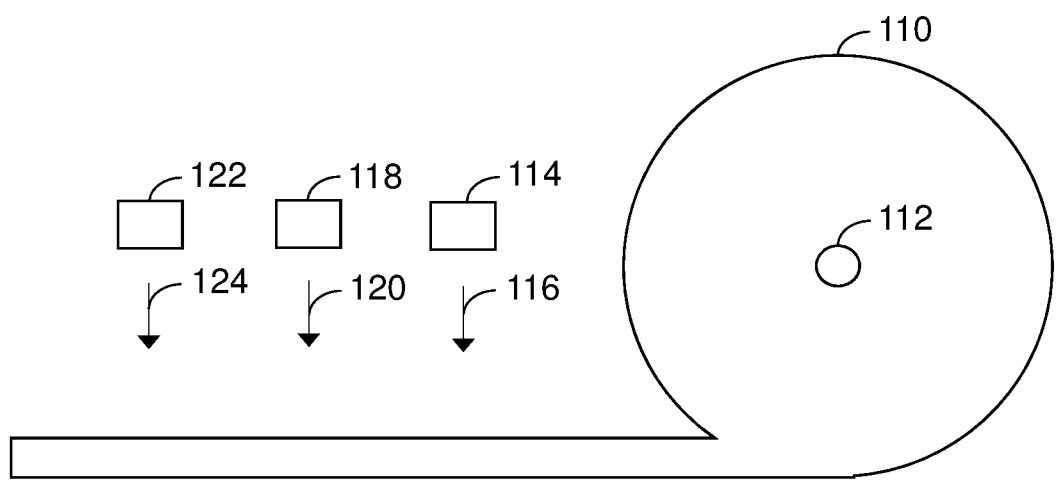
FIG. 2 is a schematic diagram that shows an example of processing the stack of FIG. 1 for manufacture of an energy storage device according to some embodiments.

In FIG. 2, the stack 100 and the substrate 102 together form an intermediate structure 110 for the manufacture of an energy storage device. The intermediate structure 110 in this example is flexible, allowing it to be wound around a roller 112 as part of a roll-to-roll manufacturing process (sometimes referred to as a reel-to-reel manufacturing process). The intermediate structure 110 may be gradually unwound from the roller 112 and subjected to further processing.

In the example of FIG. 2, grooves may be formed through the intermediate structure 110 (for example through the stack 100) using a first laser 114. The first laser 114 is arranged to apply laser beams 116 to the intermediate structure 110 to remove portions of the intermediate structure, thereby forming grooves in the stack 100. This process may be referred to as laser ablation.

After formation of the grooves, electrically insulating material may be deposited in at least some of the grooves using a material deposition system 118. The material deposition system 118 for example fills at least some of the grooves with a liquid 120 such as an organic suspended liquid material. The liquid 120 may then be cured in the grooves to form electrically insulating plugs in the grooves. An electrically insulating material may be considered to be electrically non-conductive and may therefore conduct a relatively a small amount of electric current when subjected to an electric field. Typically, an electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short circuits to be avoided.

Referring to FIG. 2, after deposition of the electrically insulating material, the intermediate structure 110 is cut along at least some of the grooves to form separate cells for an energy storage device. In some embodiments such as FIG. 2, hundreds and potentially thousands of cells can be cut from a roll of the intermediate structure 110, allowing multiple cells to be manufactured in an efficient manner.

In FIG. 2, the cutting operation is performed using a second laser 122, which is arranged to apply laser beams 124 to the intermediate structure 110. Each cut may for example be through the centre of an insulating plug such that the plug is split into two pieces, each piece forming a protective covering over exposed surfaces including edges to which it has attached. Cutting through the entire stack in this way creates exposed surfaces of the first and second electrode layers 104, 108.

Although not shown in FIG. 2 (which is merely schematic), it is to be appreciated that, after deposition of the electrically insulating material, the intermediate structure 110 may be folded back on itself, to create a z-fold arrangement having at least ten, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the first electrode layer 104 (which may be considered to form a first electrode after the cell has been separated from the remainder of the intermediate structure 110), but is prevented from contacting the other layers by the electrically insulating material. Similarly, a second electrical connector on an opposite side of the cell can be arranged in contact with the second electrode layer 108 (which may be considered to form a second electrode after the cell has been separated from the remainder of the intermediate structure 110), but is prevented from contacting the other layers by the insulating material. The insulating material may therefore reduce the risk of a short circuit between the first and second electrode layers 104, 108 and the other layers in each cell. The first and second electrical connectors may, for example, be a metallic material that is applied to the edges of the stack (or to the edges of the intermediate structure 110) by sputtering. The cells can therefore be joined in parallel simply and easily.

FIGS. 3a to 3f are schematic diagrams showing features of a method of manufacturing an energy storage device according to some embodiments. The method of FIGS. 3a to 3f may be used to manufacture an energy storage device including a stack 200 and a substrate 202, which are similar to the stack 100 and substrate 102 of FIG. 1, respectively. Features of the stack 200 of FIG. 3 which are similar to corresponding features of FIG. 1 are labelled with the same reference numeral incremented by 100. Corresponding descriptions are to be taken to apply.

Figure 3A:
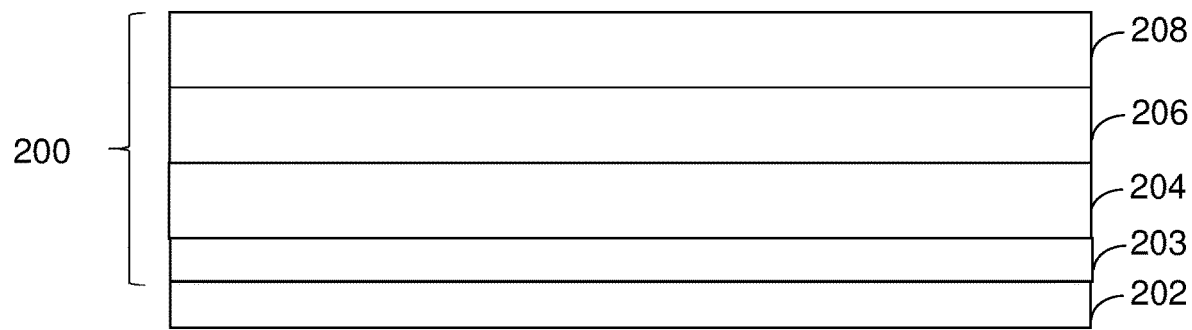
FIGS. 3a to 3f are schematic diagrams that show features of a method of manufacturing an energy storage device according to some embodiments.

In FIG. 3a, a stack 200 is provided on a substrate 202. The stack 200 includes a first electrode layer 204, an electrolyte layer 206, and a second electrode layer 208. The electrolyte layer 206 is between the first electrode layer 204 and the second electrode layer 208. The stack 200 of FIG. 3 also includes a current collector layer 203. In this example, the current collector layer 203 is a positive current collector layer as it is located between the first electrode layer 204 (which in this example is a positive electrode layer) and the substrate 202. In other embodiments, the current collector layer 203 may be omitted. Alternatively, the stack 200 may include a negative current collector layer on the second electrode layer 208, in addition to or instead of the positive current collector layer. It is to be appreciated that the widths of the elements of the stack are shown schematically and other widths are possible in other examples.

The current collector layer 203 may be provided by sputtering. The first electrode layer 204, the electrolyte layer 206 and the second electrode layer 208 may be provided for example by a vapour deposition process such as physical vapour deposition (PVD) or chemical vapour deposition (CVD), or by a coating process for use with a roll-to-roll system such as slot die coating (sometimes referred to as slit coating). Each of these layers may be provided sequentially. However, in other examples, the substrate 202 may be provided partially assembled. For example, a stack including the current collector layer 203, the first electrode layer 204, the electrolyte layer 206, and the second electrode layer 208 (or a subset of these layers) may already be arranged on the substrate 202 before the substrate 202 is provided. In other words, the substrate 202 may be provided with the stack 200 (or part of the stack 200) already arranged thereon.

Figure 3B:
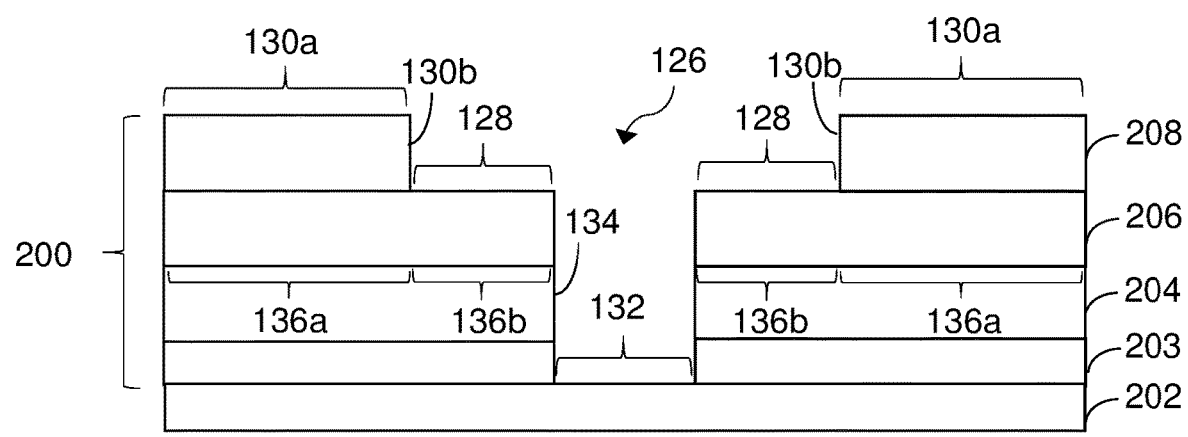

In FIG. 3b, a groove 126 is formed at least through the second electrode layer 208 and the electrolyte layer 206 such that the groove 126 is wider in the second electrode layer 208 than in the electrolyte layer 206. A groove is for example a channel, slot or trench that may be continuous or non-continuous. In some embodiments, a groove may be elongate. For example, the groove 126 of FIG. 3b may be elongate in a direction into or out of the page (as shown in FIG. 3b). A groove may extend partway through the layers of a stack 200, or through all the layers of the stack 200 to expose an exposed portion of the substrate 202. A groove may be considered to be a microfluidic channel in that it may provide a channel within which fluids, such as liquids, may be contained or may flow. For example, the groove may act as a guide to steer or otherwise direct materials (such as the electrically insulating or conductive materials discussed herein) to a desired location. A desired location may for example be a location within the groove itself. In this way, the groove may be used to contain a fluid or to constrain or prevent a fluid from flowing elsewhere (such as regions outside the groove).

The groove 126 may have any shape that is wider in the second electrode layer 208 than in the electrolyte layer 206. In FIG. 3b, the groove 126 has a substantially T-shaped cross-section. A shape of cross-section of the groove for example refers to a two-dimensional shape of the groove in a plane perpendicular to a plane of a surface of the substrate 202. In other words, the cross-section of the groove may correspond to an intersection between the groove (which is for example three-dimensional) with a two-dimensional plane which is perpendicular to the plane of the surface of the substrate 202. A substantially T-shaped cross-section is for example a cross-section with a shape which is broadly similar to or recognizable as corresponding to the shape of the capital letter T. For example, such a cross-section may include a stem section which extends along an axis in a generally vertical direction (such as within 5 degrees, 10 degrees, or 15 degrees from the vertical). A top section may meet the stem section and extend along an axis which is approximately perpendicular to the axis of the stem section. For example, the axis of the top section may be generally horizontal (such as within 5 degrees, 10 degrees, or 15 degrees from the horizontal). Typically, an upper end of the stem section meets a central portion of the top section. However, this is not always the case and, in some cases, the stem section may extend beyond the top section by a relatively small amount (such as less than 10% or less than 5% of a length of the stem section). Similarly, the stem section may not meet the top section at the precise centre or middle of the top section. Instead, the stem section may meet, for example, the middle third, or middle 20% of the top section.

In other embodiments, a cross-section of the groove 126 may have a different shape. For example, the groove 126 may have a substantially V-shaped cross-section, in which the width of the groove 126 gradually decreases with increasing depth of the groove 126 (away from a mouth or other entrance of the groove 126). In further embodiments, the groove 126 may be wider in other layers of the stack 200 than in the electrolyte layer 206. For example, the groove 126 may also be wider in the first electrode layer 204 than in the electrolyte layer 206. In such embodiments, a width of the groove 126 in the first electrode layer 204 may be the same as or different from a width of the groove 126 in the second electrode layer 208. For example, the groove 126 may have a dumbbell-shaped cross-section (which may correspond with the shape of the capital letter H, rotated by 90 degrees). In other examples, the groove 126 may have an asymmetric shape, such as an inverted L-shaped cross-section. An inverted L-shaped cross-section may be similar to a T-shaped cross-section but with one of the sides of the top section absent, such that one side of the groove corresponds to a straight line in cross-section.

The groove 126 may be formed using laser ablation. Laser ablation may refer to the removal of material from the stack 200 using a laser-based process. The removal of material may include any one of multiple physical processes. For example, the removal of material may include (without limitation) any one or a combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation). Laser ablation for example involves irradiating a surface of a layer (or layers) to be removed with a laser beam. This for example causes a portion of the layer (or layers) to be removed. The amount of a layer removed by laser ablation may be controlled by controlling properties of the laser beam such as the wavelength of the laser beam or a pulse length of a pulsed laser beam. Laser ablation typically allows the formation of the groove to be controlled in a straightforward and rapid manner. However, in other examples, alternative methods may be used to form the groove, such as photolithographic techniques.

Forming the groove 126 at least through the second electrode layer 208 and the electrolyte layer 206 forms an exposed surface 128 of the electrolyte layer 206. An exposed surface is for example a surface that, after formation of the groove 126, is not covered or otherwise in contact with another layer. In this way, an exposed surface is for example uncovered, revealed or otherwise on display after formation of the groove 126. An exposed surface may for example correspond with a wall, side, side wall or face of the groove 126.

Hence, an exposed surface may be or include any surface within the groove 126, which is uncovered by another material. For example, an exposed surface may be or include a vertical wall of the groove 126 or a generally upwardly extending inner surface of the groove 126, which extends in an upward direction with respect to the substrate 202. Alternatively, an exposed surface may be or include a horizontal wall of the groove 126 or a wall or other surface of the groove 126 which extends in a plane which is generally parallel to the horizontal or to a plane of the substrate 202. For example, an exposed surface may be or include a horizontal bottom surface of the groove 126, which is for example a deepest surface of the groove 126, which may be closest to the substrate 202. In other embodiments, the groove 126 may include one or more shelf or ledge portions, which may extend in a plane which is generally parallel to the horizontal or to a plane of the substrate 202. FIG. 3b shows such an example: in FIG. 3b, the exposed surface 128 of the electrolyte layer 208 corresponds to a shelf within the groove 126. It is to be appreciated that, in other embodiments, an exposed surface may be or include a surface outside the groove 126. For example, an exposed surface may be or include an outer surface, face or side of the stack 200 or of the substrate 202.

in FIG. 3b, the second electrode layer 208 in FIG. 3b has an exposed surface 130. The exposed surface 130 of the second electrode layer 208 in this example includes a first portion 130a, which is outside the groove 126. For example, the mouth of the groove 126, which corresponds to an opening or entrance to the groove 126, is in the same plane as a plane of the first portion 130a of the exposed surface of the second electrode layer 208. However, the first portion 130a of the exposed surface of the second electrode layer 208 is itself outside the groove, as it lies beyond the channel corresponding to the groove 126. The exposed surface 130 of the second electrode layer 208 does, however, include a second portion 130b, which is within the groove 126. In this example, the first portion 130a of the exposed surface 130 of the second electrode layer 208 corresponds with an upper surface of the stack 200, and is parallel to a plane of the substrate 202. The second portion 130b of the exposed surface 130 of the second electrode layer 208 is perpendicular to the plane of the substrate 202. However, in other examples, first and second portions of the exposed surface of the second electrode layer may be arranged differently.

In FIG. 3b, the groove 126 is formed through the second electrode layer 208, the electrolyte layer 206 and the first electrode layer 204. In the example of FIG. 3b, there is therefore an exposed surface 132 of the substrate 202. In this case, the groove 126 extends to the exposed surface 132 of the substrate 202 and an exposed surface 134 within the groove includes the exposed surface 132 of the substrate 202 (i.e. in this example, the exposed surface 132 of the substrate 202 forms a lower or bottom surface of the T-shaped groove 126). In the example of FIG. 3b, the exposed surface 134 within the groove also includes the second portion 130b of the exposed surface of the second electrode layer 208, the exposed surface 128 of the electrolyte layer 206, a further exposed surface of the electrolyte layer 206 (which in FIG. 3b is perpendicular to the exposed surface 128) and exposed portions of each of the first electrode layer 204 and the current collector layer 203. However, FIG. 3b is merely an example and, in other examples, the groove 126 may not extend into the first electrode layer 204 and/or the current collector layer 203. Alternatively, the groove 126 may extend partway through the substrate 202 in addition to extending through the first electrode layer 204 and the current collector layer 203.

In FIG. 3b, each of the layers of the stack 200 is a substantially planar layer (although other layer types are possible). For example, each of the layers may have two flat surfaces opposite to each other (such as an upper and a lower surface, or a surface closest to the substrate 202 and a surface furthest from the substrate 202). Each of these two surfaces may be parallel to each or parallel to each other within manufacturing tolerances. A layer may be considered to be substantially planar where the layer is planar within manufacturing tolerances, or has deviations from precisely planar which are relatively small, such as deviations of less than 20%, 15%, 10% or 5% from exact planarity.

By forming the groove 126 through the stack 200, for example using laser ablation, to reveal the exposed surface 128 of the electrolyte layer 206, the exposed surface 128 of the electrolyte layer 206 is substantially parallel to a surface of the substrate 202, such as the exposed surface 132 of the substrate 202. Two surfaces may be considered to be substantially parallel to each other where they are exactly parallel to each other or where they are parallel to each other within manufacturing tolerances, or within less than 20 degrees, 15 degrees, 10 degrees or 5 degrees. It may be more straightforward to provide substantially planar surfaces such as this than surfaces of different configurations, which may be non-planar. For example, where the stack 200 includes a series of substantially planar layers, the exposed surface 128 of the electrolyte layer 206 may be substantially parallel to the surface of the substrate 202 upon removal of a portion of the second electrode layer 208, without performing further processing of the electrolyte layer 206.

In the method in accordance with FIGS. 3a to 3f, the groove 126 is formed through at least part of the stack 200. However, in other methods, the stack 200 may already include a groove such as the groove 126. In other words, the stack 200 may include a pre-manufactured groove.

With the groove 126 as shown in FIG. 3b, the electrolyte layer 206 includes a first portion 136a overlapped by the second electrode layer 208 and a second portion 136b not overlapped by the second electrode layer 208. A first layer may be considered to be overlapped by a second layer where the second layer covers the first layer or where a projection of the second layer in a vertical direction (for example in a downwards direction) coincides with the first layer itself. For example, the second layer may be generally above and over the first layer. The first layer may be overlapped by the second layer where the first and second layers contact each other or where there is a layer or layers therebetween. However, the first and second layers need not be the same size or shape as each other. For example, a portion of the first layer may be overlapped by a portion of the second layer where the portion of the first layer is covered by or underneath the portion of the second layer.

Figure 3C:
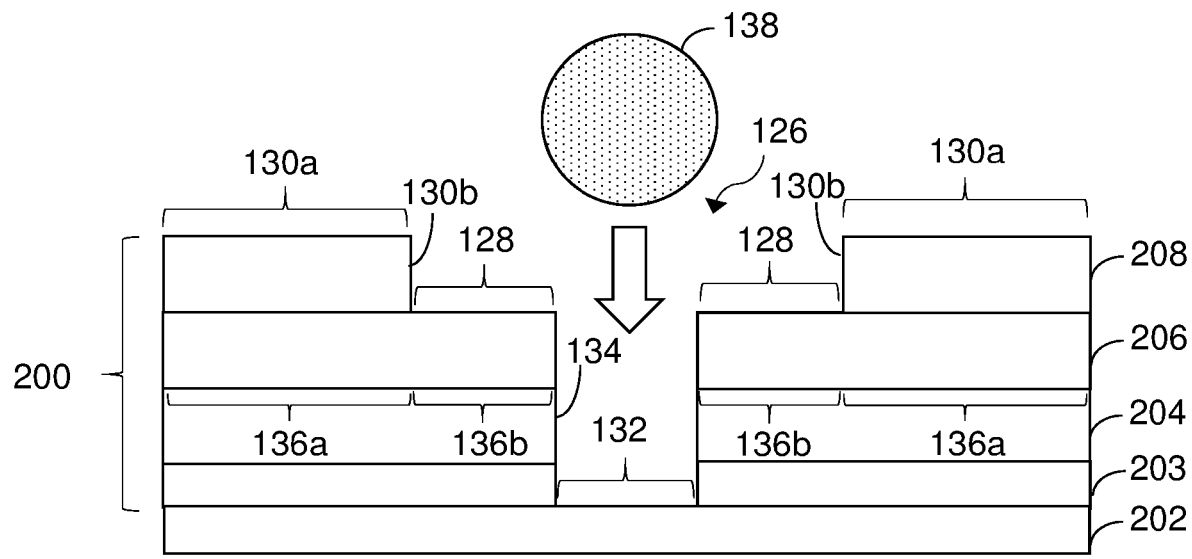
Figure 3D:
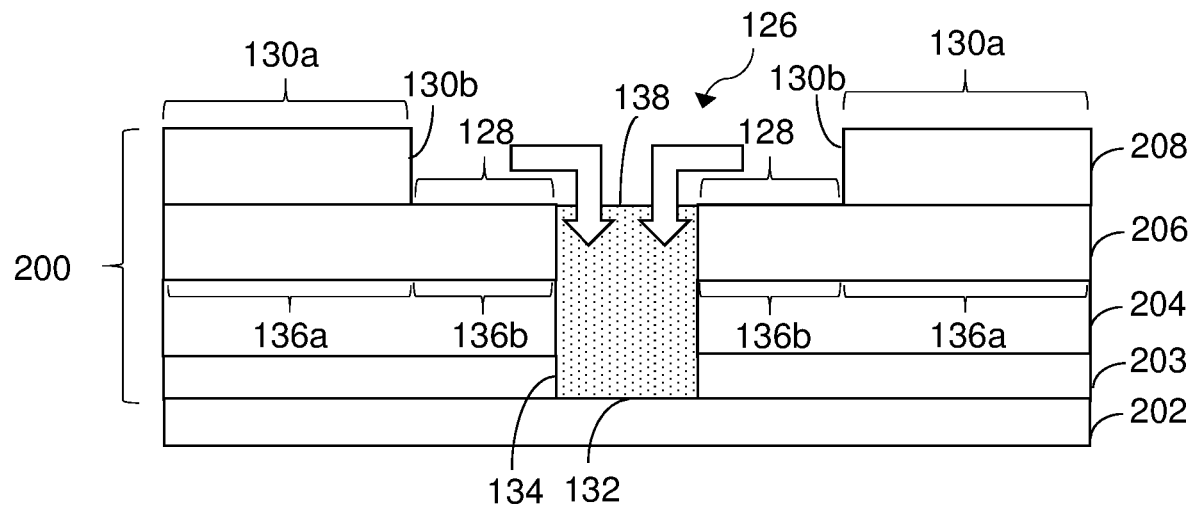

In FIG. 3c, an electrically insulating material 138 is provided in the groove 126. The electrically insulating material 138 may be provided as a first liquid, for example using an ink jet material deposition process, such as an inkjet printing process. This for example involves ejecting or otherwise propelling drops of the electrically insulating material 138, e.g. from nozzles, onto the stack 200. The drops of the electrically insulating material 138 may be deposited accurately, within the groove 126, or in a suitable position to subsequently flow or travel into the groove 126. The electrically insulating material 138 may be an ink, such as a dielectric ink. A suitable dielectric ink is DM-INI-7003, available from Dycotec Materials Ltd., Unit 12 Star West, Westmead Industrial Estate, Westlea, Swindon, SN5 7SW, United Kingdom. A dielectric material that may be used as the electrically insulating material 138 is for example an electrical insulator which may be polarized upon application of an electric field. Such a dielectric material typically also has a low electrical conductivity so that the electrically insulating material 138 may insulate the first electrode layer 204 and the second electrode layer 208 from each other. The electrically insulating material 138 may have hydrophilic properties, and may therefore have an affinity for water.

The electrically insulating material 138 may be deposited on the exposed surface 128 of the electrolyte layer 206, whereby the electrically insulating material 138 flows into contact the exposed surface 134 within the groove 126. For example, the electrically insulating material 138 may flow to contact a portion of the exposed surface 134 within the groove 126 which is more wettable to the electrically insulating material 138 than the exposed surface 128 of the electrolyte layer 206 (which is for example the exposed surface 128 of the second portion 136b of the electrolyte layer 206). In other words, the portion of the exposed surface 134 within the groove 126 may have a higher wettability with respect to the electrically insulating material 138 than the exposed surface 128 of the electrolyte layer 206.

Wettability relates to the relative affinity of a liquid or other fluid for the surface of a solid. The relative affinity for example governs the ability of the liquid to maintain contact with the surface of the solid, which depends on the interactions between the liquid and the surface when they are brought into contact with each other. A contact angle at which a liquid-vapour interface meets a solid-liquid interface may be measured to determine a wettability of the liquid for the solid (in examples in which a liquid is arrange on a solid in a vapour, such as in air). The contact angle typically depends on the difference in surface tension between the liquid and the solid at an interface between the liquid and the solid. A relatively low contact angle (such as a contact angle of between 0 and 90 degrees) indicates that the surface of the solid is relatively wettable to the liquid. This may be referred to as the surface having high wettability for the liquid. In contrast, a relatively high contact angle (such as a contact angle of more than 90 degrees but less than 180 degrees) indicates that the surface of the solid is relatively nonwettable to the liquid. This may be referred to as the surface having low wettability for the liquid. For water, a wettable surface may be referred to as hydrophilic and a nonwettable surface may be referred to as hydrophobic.

In the example of FIG. 3c, the exposed surface 132 of the substrate 202 is more wettable to the electrically insulating material 138 than the exposed surface 128 of the electrolyte layer 206. For example, the exposed surface 128 of the electrolyte layer 206 may be more hydrophilic than the exposed surface 132 of the substrate 202. In such cases, the electrically insulating material 138 may flow into contact with the exposed surface 132 of the substrate 202 upon deposition of the electrically insulating material 138 on the exposed surface 128 of the electrolyte layer 206. Flow of the electrically insulating material 138 into the groove 126 is shown schematically in FIG. 3d. This flow may occur due to the affinity of the exposed surface 132 of the substrate 202 to the electrically insulating material 138. The electrically insulating material 138 may therefore move into the groove 126 without external influences, simplifying provision of the electrically insulating material 138 within the groove 126.

After providing the electrically insulating material 138 in the groove 126, the electrically insulating material 138 may be substantially absent from the exposed surface 128 of the electrolyte layer 206. In addition, the electrically insulating material 138 may be substantially absent from contact with the second electrode layer 208. A material may be considered to be substantially absent from a surface or contact with a surface where none of the material contacts the surface or when none of the material contacts the surface within manufacturing tolerances. In some cases, though, a material may be considered substantially absent from a surface where the material contacts a minimal or relatively small proportion of the surface, such as less than 20%, 15%, 10% or 5% of the surface. In this way, a greater proportion of the exposed surface 128 of the electrolyte layer 206 may remain exposed after deposition of the electrically insulating material 138. This therefore provides a larger surface area for contact by the electrically conductive material 140 (described with reference to FIGS. 3e and 3f). Furthermore, a larger proportion of second portion 130b of the exposed surface 130 of the second electrode layer 208 may remain exposed, for subsequent contact with the electrically conductive material 140.

Figure 3E:
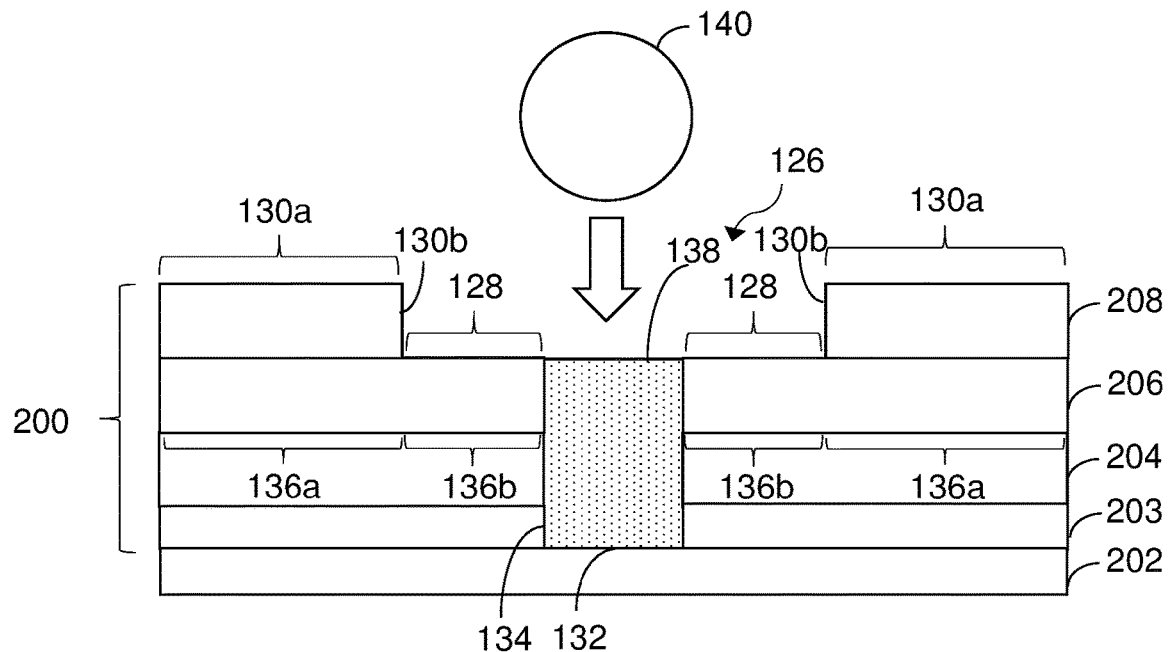

In FIG. 3e, the electrically conductive material 140 is provided in the groove 126, on the electrically insulating material 138. The electrically conductive material 140 may be provided as a second liquid. For example, similarly to the electrically insulating material 138, the electrically conductive material 140 may be provided using an ink jet material deposition process, such as inkjet printing. The electrically conductive material 140 may, similarly to the electrically insulating material 138, have hydrophilic properties. The electrically conductive material 140 may therefore have an affinity for water. A suitable electrically conductive material is PE410 available from DuPont (UK) Ltd., 4th Floor, Kings Court, London Road, Stevenage, Hertfordshire, SG1 2NG, United Kingdom.

The electrically conductive material 140 may be deposited on the first portion 130a of the exposed surface 130 of the second electrode layer 208, whereby the electrically conductive material 140 flows into the groove 126. For example, the exposed surface 128 of the electrolyte layer 206 may be more wettable for the electrically conductive material 140 than an exposed surface of the second electrode layer 208, such as the second portion 130b of the exposed surface 130 of the second electrode layer 208. For example, the exposed surface 128 of the electrolyte layer 206 may be more hydrophilic than the exposed surface of the second electrode layer 208, such as the second portion 130b of the exposed surface 130 of the second electrode layer 208. This may therefore cause the electrically conductive material 140 to move into the groove 126, without the application of an external stimulus, due to the affinity of the electrically conductive material 140 for the second portion 130b of the exposed surface 130 of the second electrode layer 208. In other embodiments, the electrically conductive material 140 may be deposited in a different location than on the first portion 130a of the exposed surface 130 of the second electrode layer 208, The electrically conductive material 140 may nevertheless flow into the groove 126, due to the preference of the electrically conductive material 140 to wet an exposed surface within the groove 126.

After deposition of the electrically conductive material 140 within the groove 126, the electrically conductive material 140 may flow into contact with the second portion 130b of the exposed surface 130 of the second electrode layer 208. This is shown schematically in FIG. 3f. In this example, the exposed surface 128 of the electrolyte layer 206 is more wettable for the electrically conductive material 140 than the electrically insulating material 138. For example, the electrically insulating material 138 may be more hydrophilic than the exposed surface 128 of the electrolyte layer 206. Hence, the electrically conductive material 140 prefers to wet the exposed surface 128 of the electrolyte layer 206 than the electrically insulating material 138. The electrically conductive material 140 therefore recedes away from the electrically insulating material 138 and, in this case, towards the second portion 130b of the second electrode layer 208. The second portion 130b of the exposed surface 130 of the second electrode layer 208 may be more wettable for the electrically conductive material 140 than the electrically insulating material 138. This may further cause the electrically conductive material 140 to flow towards, and into contact with, the second portion 130b of the exposed surface 130 of the second electrode layer 208.

After providing the electrically conductive material 140 in the groove 126, the electrically conductive material 140 may be substantially absent from the first portion 130a of the exposed surface of the second electrode layer 208. This may be due to the wettabilities of the various surfaces. For example, where the first portion 130a of the exposed surface of the second electrode layer 208 is less wettable to the electrically conductive material 140 than the second portion 130b of the exposed surface of the second electrode layer 208 and the exposed surface 128 of the electrolyte layer 206, the electrically conductive material 140 may spontaneously flow into the groove 126 and out of contact with the first portion 130a of the exposed surface of the second electrode layer 208.

In embodiments such as FIG. 3, the exposed surface 128 of the electrolyte layer 206 has a width of greater than or equal to approximately 5 micrometres in a plane parallel to a plane of a surface of the substrate 202, such as a plane of the exposed surface 132 of the substrate 202. In this context, a width of approximately 5 micrometres is for example a width of 5 micrometres within measurement or manufacturing tolerances, which may be a width of 5 micrometres within plus or minus, 20%, 15%, 10% or 5% of 5 micrometres. The exposed surface 128 is for example a surface of the second portion 136b of the electrolyte layer 206, which is not overlapped by the second electrode layer 208.

The width of the exposed surface 128 of the electrolyte layer 206 is for example taken from an interface between the second portion 130b of the exposed surface 130 and the exposed surface 128 to an end of the exposed surface 128, in the plane parallel to the plane of the surface of the substrate 202. With a width of greater than or equal to approximately 5 micrometres, the exposed surface 128 may more effectively contain the electrically conductive material 140 within the groove 126 than otherwise.

Use of the groove 126 of FIGS. 3a to 3f may enable easy containment of the electrically insulating material 138 and the electrically conductive material 140 in predetermined positions relative to other elements of the stack 200. Containment of these materials may be improved by using the wettabilities of various surfaces of the stack 200 and of the groove 126 to control where the materials wet (or dewet) and hence where the materials flow, and remain, absent external stimulus. The containment of these materials within the groove 126 may be more straightforward than other approaches which aim to improve containment of electrically insulating or conductive materials within a channel.

Figure 3F:
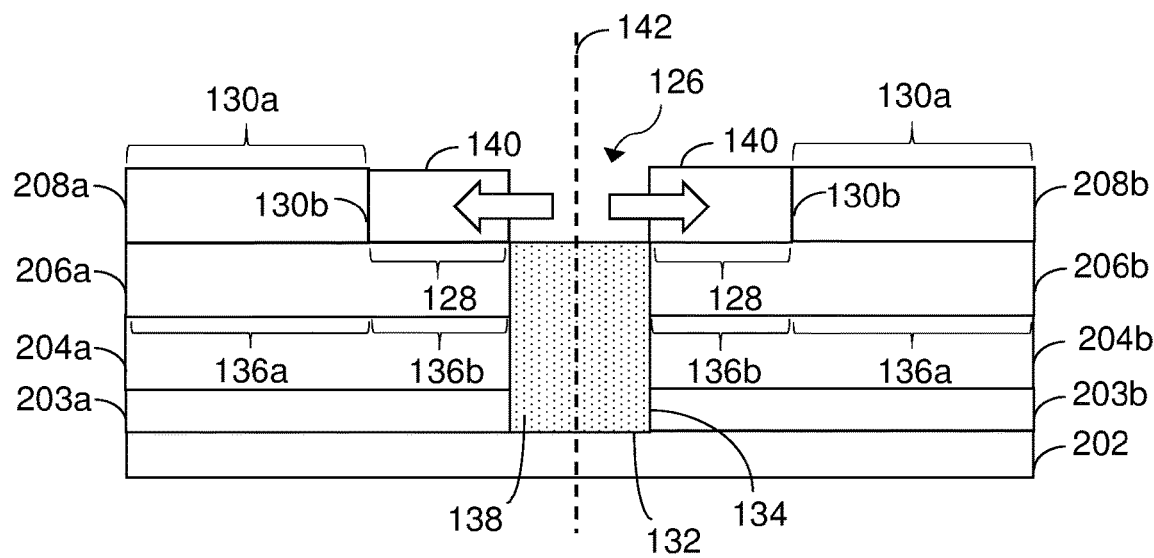

The structure shown in FIG. 3f may be considered to correspond to an intermediate structure for the manufacture of an energy storage device. For example, each of the layers of the stack 200 may have a first portion (appended by the letter "a" in FIG. 3f) for formation of a first cell, and a second portion (appended by the letter "b" in FIG. 3f) for formation of a second cell, after the stack 200 is separated into cells. For example, the stack 200 may be separated into cells by cutting through the stack 200 and the substrate 202 along an axis 142 passing through the electrically insulating material 138, which may for example be a vertical axis passing through a centre of the electrically insulating material 138 (although other axes are possible in other examples). This process may be used to produce a first cell with a second electrode 208a, an electrolyte 206a, a first electrode 204a and a current collector layer 203a, and a second cell with a second electrode 208b, an electrolyte 206b, a first electrode 204b and a current collector layer 203b.

Hence, the method of FIG. 3 may be used to manufacture an energy storage device including a substrate 202 and a stack 202 on the substrate 202, where the stack includes a first electrode 204a, 204b, a second electrode 208a, 208b and an electrolyte 206a, 206b between the first electrode 204a, 204b and the second electrode 208a, 208b. In the example of FIG. 3, the first electrode 204a, 204b is closer than the second electrode 208a, 208b to the substrate 202, although this need not be the case. The electrolyte 206a, 206b in such an energy storage device includes a first portion overlapped by the second electrode 208a, 208b and a second portion not overlapped by the second electrode 208a, 208b. Such an energy storage device further includes an electrically insulating material 138 in contact with the first electrode 204a, 204b and the electrolyte 206a, 206b and an electrically conductive material 140 in contact with the second portion of the electrolyte 206a, 206b and the second electrode 208a, 208b.

Figure 4:
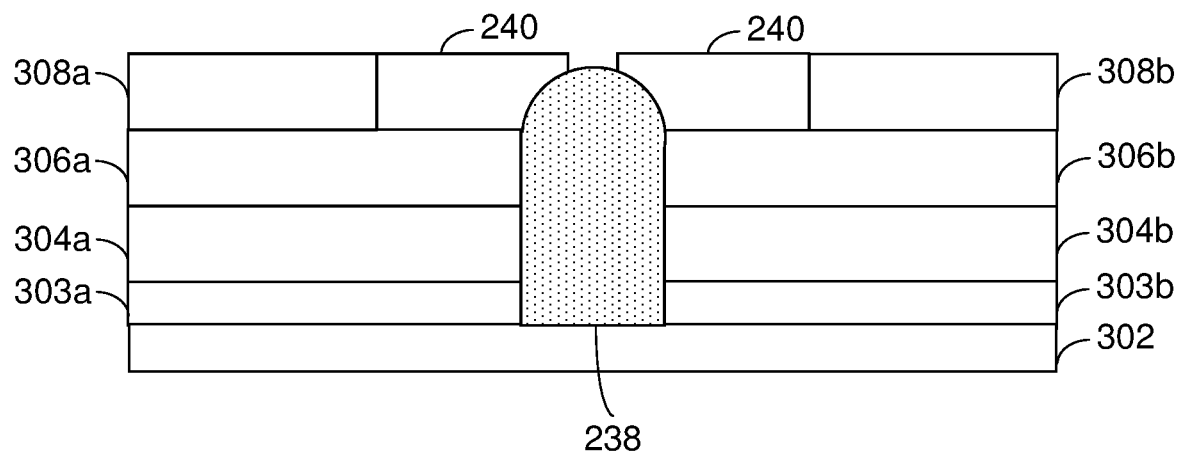
FIG. 4 is a schematic diagram showing an intermediate structure for manufacture of an energy storage device according to some embodiments.

The method of FIG. 3 is merely illustrative and other methods may be used to manufacture an energy storage device using the principles described herein. FIG. 4 shows a further example of an intermediate structure for manufacture of an energy storage device. Features of FIG. 4 which are similar to corresponding features of FIG. 3f are labelled with the same reference numerals incremented by 100. Corresponding descriptions are to be taken to apply. Some reference numerals are omitted in FIG. 4, though, for clarity.

The intermediate structure of FIG. 4 is the same as that of FIG. 3f except that, in FIG. 4, the electrically insulating material 240 in the groove has a curved surface rather than a flat surface. The curved surface of the electrically insulating material 240 is for example a surface of the electrically insulating material 240 closest to a mouth or other entrance to the groove. For example, the curved surface of the electrically insulating material 240 may be an upper surface of the electrically insulating material 240, or a surface of the electrically insulating material 240 furthest from the substrate 302.

A curved surface is for example a rounded surface. In this example, the electrically insulating material 240 has a convex surface, which curves or extends outwardly, in a direction away from a plane of the surface of the substrate 302. A convex surface of the electrically insulating material 240 for example urges the electrically conductive material 240 into contact with the second electrode layer 308, improving contact between the electrically conductive material 240 and the second electrode layer 308.

In this example, the electrically conductive material 240 is in contact with the exposed surface of the electrolyte layer 306 and a surface of the electrically insulating material 238 (and this may be the case in other examples in which the surface of the electrically insulating material 238 is of a different shape).

Figure 5:
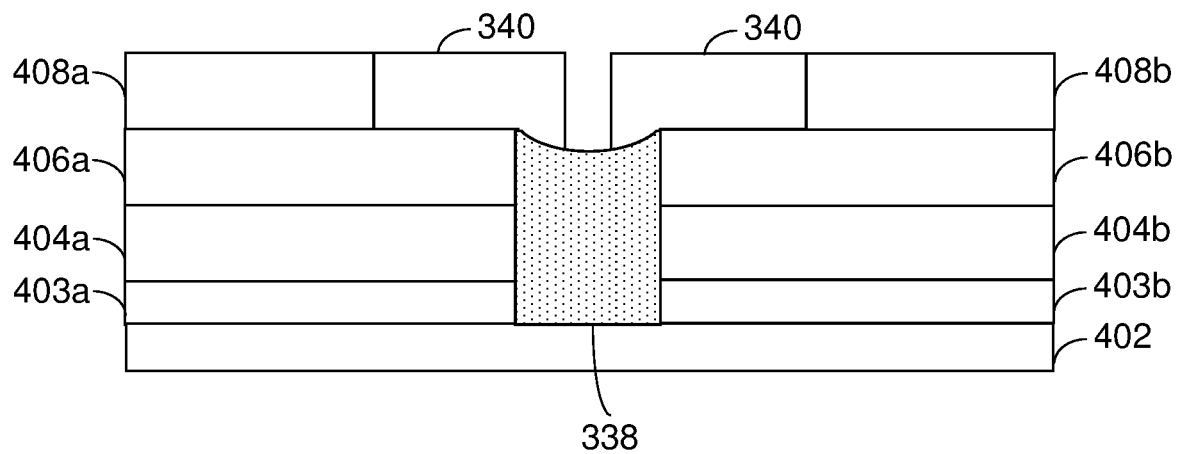
FIG. 5 is a schematic diagram showing an intermediate structure for manufacture of an energy storage device according to yet further examples.

FIG. 5 shows a further example. Features of FIG. 5 which are similar to corresponding features of FIG. 4 are labelled with the same reference numerals incremented by 100. Corresponding descriptions are to be taken to apply.

FIG. 5 is the same as FIG. 4 except that the electrically insulating material 338 in the groove has a concave surface. A concave surface for example curves inwards or is hollowed in an inwards direction, towards a plane of a surface of the substrate 402. With this arrangement of the electrically insulating material 338, the electrically conductive material 340 has a larger surface area for contact with other electrical components than otherwise.

A curvature of the electrically insulating material may be controlled for example by controlling a property of the electrically insulating material and of layers of the stack. For example, a quantity of the electrically insulating material provided in the groove may be altered to alter a curvature of the surface of the electrically insulating material. For example, overfilling of the groove (or providing a larger quantity of the electrically insulating material than in FIG. 3f) may provide an electrically insulating material 238 with a convex surface, as shown in FIG. 4. Conversely, underfilling of the groove may provide an electrically insulating material 238 with a concave surface. Furthermore, a wettability of an exposed surface of the electrolyte layer 306, 406 within the groove (such as a surface of the electrolyte layer 306, 406 which is perpendicular to the exposed surface 128 of FIG. 3) may be controlled to control a curvature of the surface of the electrically insulating material 306, 406.

The above embodiments are to be understood as illustrative examples. Further examples are envisaged. In the examples above, the first electrode layer is closer than the second electrode layer to the substrate. However, in other examples, the second electrode layer may be closer than the first electrode layer to the substrate. In such cases, a cross-section of the groove may be substantially an inverted T-shape or substantially an inverted V-shape. In examples such as this, the groove may therefore narrow in shape towards a mouth of the groove, rather than away from the mouth of the groove.

To manufacture such a groove, the stack may be provided on a first side of a substrate and a laser ablation system may be arranged on a second side of the substrate, opposite to the first side. A laser beam generated by the laser ablation system may be transmitted through the substrate, for example if the substrate is transparent. The laser beam may then be incident on an underside of the stack (which is for example in contact with the first side of the substrate). The laser beam may be used to ablate material of the stack, to form the groove through the stack, without cutting the substrate or without removing all of the substrate in the region of the substrate corresponding to the groove. However, it is to be appreciated that other methods may be used to form a groove with an inverted shape such as this. For example, an angled laser beam may be provided, where the laser beam is angled relative to a surface of a substrate on which a stack is provided. An angle of the laser beam may be controlled to selectively remove portions of the stack to provide a groove with a desired or otherwise predetermined shape, in cross-section.

In embodiments herein, the wettabilities of the various surfaces may be inherent properties of the materials used. In some cases, though, the wettabilities of some or all of the surfaces may be altered or otherwise affected by processing applied to the surfaces. For example, where an exposed surface is formed by forming a groove through a layer, the wettability of the exposed surface may differ from an inherent wettability of a material of the layer. For example, exposing an exposed surface by laser ablation may alter the wettability of the exposed surface compared with other surfaces of the same material, which are not formed by laser ablation. A degree of change of wettability of an exposed surface may be controlled or varied by changing processing conditions. For instance, wettability may be increased or reduced by varying an environment in which laser ablating takes place. In one example, laser ablating in the presence of a gas (e.g. an inert gas) may result in a different wettability compared to laser ablating in the presence of air. On the basis of the foregoing, systematic tests may be conducted to determine relationships between wettability and differences in processing conditions.

In some embodiments such as this, formation of the groove may provide a region into which the electrically insulating material and electrically conductive material may be deposited, while also creating exposed surfaces within the groove with appropriate wettabilities to aid confinement of the electrically insulating material and electrically conductive material within the groove. This may simplify fabrication of an energy storage device with such a groove compared with other approaches in which subsequent processing is applied to an exposed surface to alter a wettability of the exposed surface.

However, in other embodiments, a wettability of the exposed surface may be altered after creation of the exposed surface. For example, an exposed surface may be subjected to electromagnetic radiation to alter the wettability of the exposed surface. Irradiating an exposed surface with ultraviolet (UV) radiation may, for example, increase a hydrophilicity of the exposed surface. An environment in which irradiation of the exposed surface takes place may be varied to control a degree of change of wettability of the exposed surface.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. An energy storage device formed by a method comprising:
providing, on a substrate, a stack for an energy storage device, the stack comprising a first electrode layer, a second electrode layer, and an electrolyte layer between the first electrode layer and the second electrode layer;

forming a groove at least through the second electrode layer and the electrolyte layer such that the groove is wider in the second electrode layer than in the electrolyte layer;

providing an electrically insulating material in the groove; and providing an electrically conductive material in the groove, on the electrically insulating material, in direct contact with a portion of the electrolyte layer and in direct contact with the second electrode layer.

2. An energy storage device comprising:

a substrate;

a stack on the substrate, the stack comprising:

a first electrode;

a second electrode; and an electrolyte between the first electrode and the second electrode, the first electrode closer than the second electrode to the substrate, the electrolyte comprising a first portion overlapped by the second electrode and a second portion not overlapped by the second electrode;

an electrically insulating material in contact with the first electrode and the electrolyte; and an electrically conductive material in direct contact with the second portion of the electrolyte and the second electrode.

3. The energy storage device of claim 2, wherein a width of a surface of the second portion of the electrolyte, in a plane parallel to a plane of a surface of the substrate, is greater than or equal to approximately 5 micrometres.

4. The energy storage device of claim 2, wherein the electrically insulating material is absent from contact with the second electrode.

* * * * *